Jan. 5, 1960 A. W. LO 2,920,215

SWITCHING CIRCUIT

Filed Oct. 31, 1956

INVENTOR.
Arthur W. Lo
BY Morris A. Rabkin
ATTORNEY.

2,920,215

SWITCHING CIRCUIT

Arthur W. Lo, Fords, N.J., assignor to Radio Corporation of America, a corporation of Delaware Application October 31, 1956, Serial No. 619,471

2 Claims. (Cl. 307—88.5)

This invention relates to a switching circuit, and more particularly to a transistor circuit which may be a differential circuit or a dynamic flip-flop.

A bistable multivibrator, usually referred to as a flip-flop, is a circuit having two stable states or conditions, and two input terminals, one of which is denoted set, the other which is denoted reset. The flip-flop may be changed from one of these stable conditions to the other by the application of signals at the proper point (set or reset terminal) in the circuit. This property of a flip-flop has been employed to compare the magnitude of two signals (applied to the set and reset terminals, respectively). A disadvantage of such a comparator lies in the relatively large power required to change the state of the flip-flop, and, consequently, the relatively large inequality necessary to provide a response.

Further, many flip-flops include two conductive elements, either one or the other of which is conducting at any given time. Such conduction requires relatively large standby power.

It is an object of this invention to provide a novel sensitive, differential circuit.

Another object of this invention is to provide a novel semi-conductor device circuit for sampling two signals to determine their difference at any desired instant, which circuit requires no standby power.

An additional object of this invention is to provide a novel transistor switching circuit with a temporary memory function, which circuit may utilize very small switching signals.

Still another object of this invention is to provide a novel transistor dynamic flip-flop.

In accordance with the invention, a pair of transistors are connected in the form of a bistable multivibrator without the normal D.C. energizing source. Instead, a pulse source is substituted for such D.C. energizing source. Either high frequency type transistors or low frequency type transistors are employed depending on the operation desired for the circuit. In this regard, the circuit may be said to have two forms—the non-storage form and the storage form, respectively, and corresponding modes of operation.

In the first form of operation, the instantaneous values of two input signals at the time of application of the energizing pulse are compared. The input (priming) signals to be compared are applied to the set and reset inputs of the multivibrator (here the base electrodes of the two transistors). With the application of the energizing pulse, the bistable multivibrator assumes one of its stable states depending upon which input signal has the larger amplitude, and correspondingly, which multivibrator transistor receives the larger priming signal. This stable state prevails for the duration of the energizing pulse.

The second form in operation utilizes the minority carrier storage property which is dominant in the relatively low frequency transistors. In this mode of operation, a relatively large input signal may inject into one transistor enough minority carriers, which remain stored in the transistor for a short interval of time after the termination of the input signal, to "prime" that transistor to be more conductive than the other when an energizing pulse is applied. A dynamic flip-flop may be constructed using this storage effect in a transistor flip-flop, and the preferential conduction effect preserved indefinitely.

The novel features of this invention as well as the invention itself, both as to its organization and method of operation, will best be understood from the following description, when read in connection with the accompanying drawing, in which like reference numerals refer to like parts, and in which.

Figure 1:
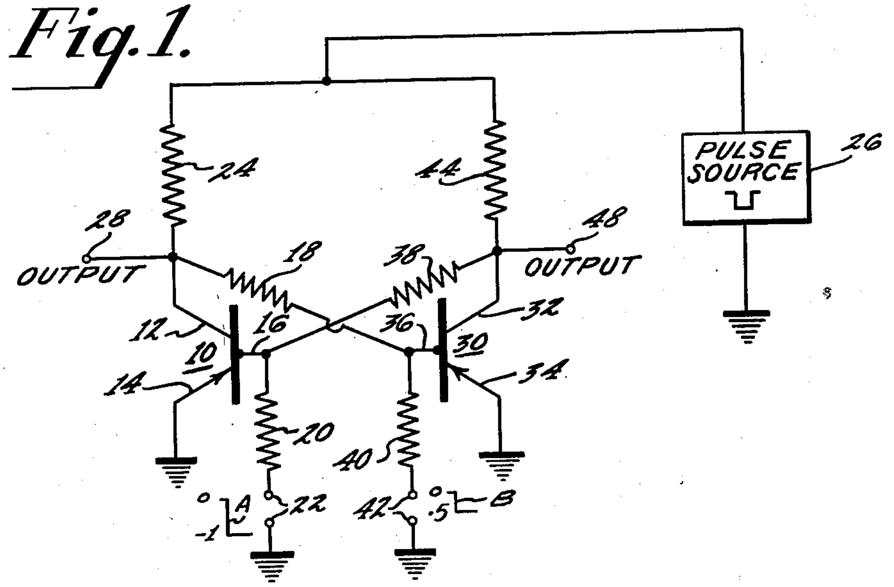
Figure 1 is a circuit diagram illustrating a transistor switching circuit in accordance with this invention.

In Figure 1, a bistable multivibrator of the Eccles-Jordan type is illustrated. The flip-flop includes first and second transistors 10 and 30, respectively, of the P-N-P junction type. Each of the transistors 10 and 30 include, respectively, collector electrodes 12 and 32, emitter electrodes 14 and 34, and base electrodes 16 and 36. The emitter electrodes 14 and 34 of the first and second transistors 10 and 30 are coupled to a point of reference potential which is denoted by the conventional ground symbol. The respective collector electrodes 12 and 32 of the flip-flop transistors 10 and 30, respectively, are coupled through collector load resistors 24 and 44 to an energizing current pulse source 26.

The energizing pulse source 26 is returned to ground and may be any source suitable for providing a negative-going current pulse having, for example, a negative amplitude of about 0.1 milliampere. The pulse source 26 may, for example, be a one-shot multivibrator which provides an output pulse of predetermined amplitude and time duration. Some other suitable pulse energizing sources are described in Chapter 10 of the book "Theory and Applications of Electron Tubes" by Reich, published in 1944 by McGraw-Hill. The pulse source 26, when not providing an output pulse, should have a normal (quiescent) output voltage level the same as that of ground.

For normal amplifying action of a P type transistor, the voltage between the emitter and base electrodes should be in the forward or relatively conducting direction, and the bias voltage between the collector and base electrodes should be in the reverse or non-conducting direction. For a transistor of N type, conductivity (P-N-P junction type) for normal amplifying action, the collector is negative with respect to the base while the voltage on the emitter is positive with respect to the base.

The collector 12 of the first transistor 10 is connected through a first cross coupling resistor 18 to the base 36 of the second transistor 30. Also, the collector 32 of the second transistor 30 is coupled through a second cross coupling resistor 38 to the base 16 of the first transistor 10. An output may be taken from the collector 12 of the first transistor 10 at the output terminal 28. This output 28 is preferably taken with respect to ground, although any other point in the circuit may be employed as a reference. Similarly, an output for the second transistor 30 may be taken from the terminal 48 which is coupled to the collector 32 of the second transistor 30.

The base 16 of the first transistor 10 is coupled through an isolating resistor 20 to one of a pair of first input terminals 22. The other of the pair of first input terminals 22 is coupled to ground. In a similar manner, the base 36 of the second transistor 30 is coupled through an isolating resistor 40 to one of a pair of second input terminals 42. The other of the pair of second input terminals 42 is coupled to ground.

First and second input signals A and B, respectively, to be compared are applied to the first and second input terminals 22 and 42, respectively. The input signals to be compared may be either signals subject to slow variation or intermittent signals.

The circuit of Figure 1 has two modes of operation depending on whether high frequency or low frequency type transistors are employed. In its first mode of operation employing high frequency transistors, the circuit of Figure 1 determines the instantaneous magnitude of two input signals applied at the respective first and second input terminals 22 and 42. Comparison takes place at the instant the energizing pulse for the energizing pulse source 26 is supplied. In the alternative mode of operation, the storage effect of the first and second low frequency transistors 10 and 30 may be utilized to prime either the first or second transistors, 10 or 30, respectively, and thereafter applying the energizing pulse. Other transistor storage applications will be discussed in some detail in Figure 2.

For the moment, assume that the first mode of operation is employed and the instantaneous values of two steady state input signals, A applied to the first input terminal 22, and B applied at the second input terminal 42, are to be compared. Assume also that the input signal A has a negative-going magnitude of 1 volt from a quiescent (steady state) value of 0 volts compared to ground, and that the input signal B has a negative-going value of ½ volt, from the quiescent value of 0 volts compared to ground. Upon the application of the input signals, A and B, emitter to base current flows in each of the first and second transistors 10 and 30. Emitter to base current flow places some minority charge carriers in the base region of each of these transistors. Since the voltage at the first input terminals 22 is larger in amplitude than the voltage at the second input terminals 42, more minority charge carriers are available in the base region of the first transistor 10.

Upon the application of the negative energizing pulse from the source 26 the voltage at the collectors 12 and 32 substantially instantaneously decreases. Because of the presence of minority charge carriers in the base region of the first and second transistors 10 and 30, respectively, current flows between the emitter and collector of each transistor. The emitter to collector current in the respective transistors 10 and 30 passes through the respective collector load resistors 24 and 44 to the pulse source 26 resulting in an incremental voltage rise in a positive direction at the collectors 12 and 32 of each transistor. Due to the fact that there are more minority charge carriers present in the base area of the first transistor 10 than in the base area of the second transistor 30, current flow through the first transistor 10 is the greater. Correspondingly, the voltage at the collector 32 of the second transistor 30 is more negative than that at the collector 12 of the first transistor 10. Because collector 32 is cross-coupled to base 16 through resistor 38, and collector 12 is cross-coupled to base 36 through resistor 18, the difference of the collector voltages makes transistor 10 even more conductive than transistor 30. Thus, the cross-coupled circuit provides positive feedback to cause a trigger action. The first transistor 10 is triggered on, that is, into a relatively highly conductive state. The second transistor 30 is triggered off, that is, into a relatively non-conductive state. Upon the termination of the energizing pulse from the pulse source 26 both transistors 10 and 30 return to their original state of non-conduction. For the duration of the pulse from the pulse source 26, a negative output signal is available from the output terminal 28 indicating that the input signal A at the first input terminals 22 is larger than the input signal B.

In a conventional bistable circuit with a D.-C. power supply, the circuit is operated in one stable state or the other. To change the stable state, a signal triggering pulse of considerable amplitude and time duration is required to bring the circuit out of the stable state in which it is "locked" and to initiate the trigger action. In the present circuit, the priming signal can be quite small (in the order of 10 microamperes). The energizing pulse supplies the triggering power and no other power source is required.

The input signals (priming signals) can be applied through the isolating resistors 20 and 40 as illustrated, through a diode, or through some other suitable isolating impedance. In the alternative, the priming signals may be applied directly to the base electrodes of the flip-flop transistors. The operation of the circuit is such as to compare the input signals at the instant the energizing pulse is supplied. For the duration of the energizing pulse, the circuit is in one of the two stable states and further variations in the relatively small input signals have virtually no effect upon the circuit.

In its second mode of operation, the storage effect of the low frequency transistors may be utilized in Figure 1 to provide a short interval information storage circuit in which an output signal is derived upon the application of an energizing pulse from the source 26. The energizing pulse may be applied at any time within the storage period of the transistors after application of the input priming pulse. Thus, consider that a single negative input signal A is applied at the first input terminals 22. The first transistor base 16 is biased in a forward direction relative to the first transistor emitter 14. Charge carriers are thereby introduced in the base region of the first transistor 10. Because of the time required for their diffusion and recombination, the charge carriers remain in the transistor for a period of time, and keep the transistor relatively conductive. During this period, the first transistor 10 may be said to be storing the input pulse A. Also, the input pulse A may be said to have primed the first transistor 10.

If now, during the storage period of the transistor as described above, an energizing pulse is applied, emitter collector current 14—12 will flow in the first transistor 10. As described hereinabove, the difference in voltage at the collectors of the two transistors makes transistor 10 even more conductive than transistor 30, and the trigger action of the flip-flop takes place. The first transistor 10 is now in a state of relative conduction and the second transistor 30 in a state of relative non-conduction. This state of conduction prevails for the duration of the energizing pulse from the pulse source 26. Note, that by reversing the conductivity type of the transistors and the polarity of each of the signals (pulses) employed, a circuit which operates similarly to that described above is obtained. While the following circuit values are not to be considered as a limitation, these values have operated in a successful circuit in accordance with this invention. In the circuit shown in Figure 1 operating in the non-storage mode, the high frequency transistors 10 and 30 were of the 2N140 type. When operating in the storage mode, low frequency transistors of the 2N109 type were employed. The isolating resistors 20 and 40 were each of 100,000 ohms resistance. The collector load resistors 24 and 44 were each of 1,000 ohms resistance. The cross coupling resistors 18 and 38 were each of 5,000 ohm resistance. The energizing pulse from the source 26 was a 10 volt negative-going pulse having a 5-microsecond duration. The priming pulses to the input terminal 22 or 42 were of a 1 microsecond duration and provide a current flow of about 100 microamperes.

Figure 2:
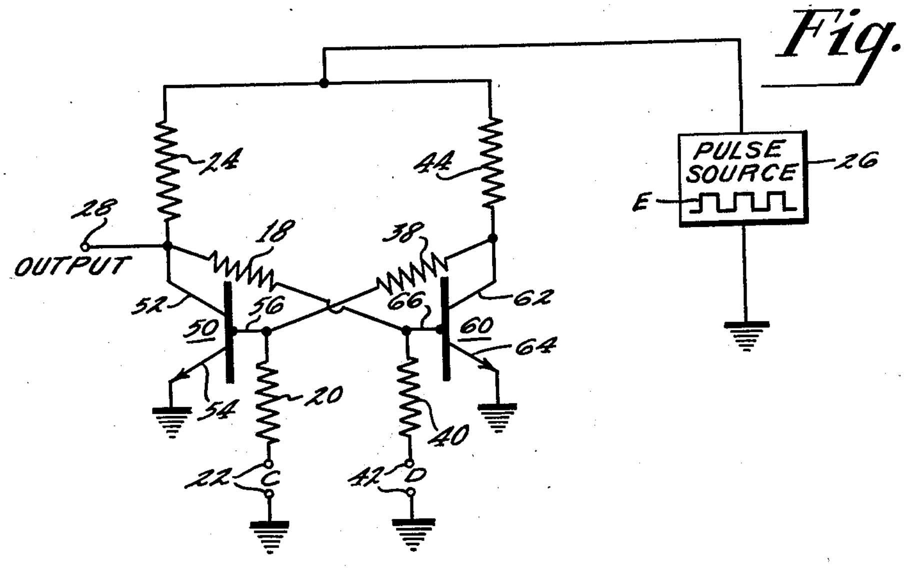
Figure 2 is a circuit diagram illustrating a transistor dynamic flip-flop in accordance with this invention; and, Figure 3 is an illustration of the waveforms at several points in the circuit of Figure 2.

Referring to Figure 2, the storage effect to two N-P-N junction transistors 50 and 60 is employed to provide a dynamic flip-flop. The circuit of Figure 2 is substantially identical to the circuit of Figure 1, and, accordingly, the same reference numerals have been applied to the several elements. In the case of Figure 2, however, the transistors 50 and 60 are relatively low-frequency junction transistors having an appreciable minority charge carrier storage effect. Each of these transistors has a collector 52—62, respectively, an emitter 54—64, respectively, and a base 56—66, respectively. The transistors may, for example, be of the 2N35 type. The energizing pulse source 26 in this case provides repetitive positive-going pulses as is illustrated by the waveform E of Figure 3. These positive-going pulses have a reference or zero level of ground.

Upon the application of the first energizing pulse from source 26, it is assumed that no prior priming signals C or D at either of the inputs 22 or 42 has been applied. If now, a first energizing pulse E (indicated by the numeral 1 appearing in the waveform $E_0$ of Figure 3) is applied, both transistors 50 and 60 tend to conduct. Because of some unavoidable asymmetry in the circuit, one transistor (say, the second transistor 60) starts to conduct more than the other (the first transistor 50). Because of the feedback by way of the cross coupling resistors 18 and 38, the cumulative trigger action as described above takes place until the second transistor 60 is relatively conducting and the first transistor 50 is relatively non-conducting. The output derived between the terminal 28 and ground is illustrated by the output graph in Figure 3 as a positive pulse. The circuit remains in this stable state for the duration of the first energizing pulse E.

Figure 3:
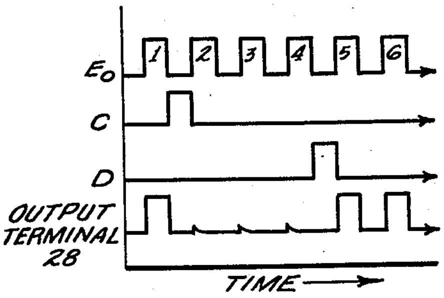

Assume now that a priming signal C is next supplied at the first input terminals 22 in the absence of energizing pulse E. The priming signal C terminates immediately before the application of the second energizing pulse E from the source 26 as is indicated in the graphs of Figure 3, or it may be terminated after the application of the energizing pulse. The priming signal C places the first transistor 50 in a relatively conductive condition and the second transistor 60 in a relatively non-conducting condition. Upon application of the energizing pulse E, the first transistor 50 becomes conductive. Relatively little output signal results at the output terminal 28 other than a small transient disturbance created at the time the second energizing pulse E is applied. This disturbance results partly from the pulse E and partly from the trigger action of the flip-flop.

Upon the termination of the second energizing pulse E, a number of minority charge carriers remain in the base region of the previously conducting first transistor 50. These minority carriers require a finite time to move by diffusion through the base region of the first transistor 50 to the collector 52. These minority charge carriers are dissipated upon passing through the collector base junction of the first transistor 50. Until such time as these carriers are dissipated, the transistor may be said to be in storage. This effect, which is the well known storage effect, is the same as that described above with reference to Figure 1. During this storage period, it may be said that the transistor is primed. If the repetition rate of the energizing pulses from the source 26 is made sufficiently great such that the time interval between energizing pulses is less than the storage time of the transistors employed, dynamic flip-flop operation is possible.

Thus, the first transistor 50 is still primed at time of application of the third energizing pulse E from the source 26. The resulting collector to emitter current in the primed transistor 50 is therefore greater than the collector to emitter current in the unprimed second transistor 60 and the circuit triggers to the same stable state as before. The first transistor 50 is conducting and the second transistor 60 is relatively non-conducting. Substantially no output pulse is produced in the output terminal 28 with respect to ground other than the temporary transient disturbance described above. With each subsequent pulse from the energizing source 26, the previously conducting first transistor conducts. The state of the dynamic flip-flop is therefore maintained.

Assume that in the time interval between the fourth and fifth energizing pulses E, a signal D is applied at the second input terminals 42. The second transistor 60 is primed in favor of conduction by this pulse. Upon the application of the fifth energizing pulse E from the source 26, the second transistor 60 provides the greater collector to emitter current 62—64. The direct priming by the pulse D is sufficient to overcome the storage in the first transistor 50 and the flip-flop is triggered to that stable state wherein the second transistor 60 is relatively conducting and the first transistor 50 is relatively non-conducting. In this instance, the output signal appearing at the output terminal 28 is essentially the energizing pulse E.

Upon the occurrance of a sixth and subsequent pulse E from the source 26, the state of the dynamic flip-flop remains the same. With the termination of each energizing pulse, the storage in the base region of the previously conducting second transistor 60 is sufficient to maintain that transistor primed until the occurrence of the succeeding energizing pulse at which time the conducting state of the flip-flop is returned to its previous condition. In this way, the circuit operates as a dynamic flip-flop.

In one case in which the circuit of Figure 2 was successfully operated, the dynamic flip-flop action was obtained with a pulse waveform E having a pulse repetition rate of one megacycle.

There has thus been described a relatively simple high speed switching circuit which may compare the instantaneous amplitude between two relatively low power signals. In addition, the results of such comparison may be maintained by operating the switching circuit as a dynamic flip-flop. In an alternative embodiment, the switching circuit may provide a temporary memory function of which of the input signals had the larger amplitude.

What is claimed is:

1. A circuit for comparing the amplitudes of two pulses comprising, in combination, a pair of cross-coupled transistors, each capable of appreciable storage of minority charge carriers; means for conditioning one of said transistors to conduct more heavily than the other comprising means for injecting charge carriers into one of said transistors in an amount proportional to the amplitude of one of said pulses and into the other of said transistors in an amount proportional to the amplitude of the other of said pulses; and means for simultaneously applying a reverse biasing pulse to the output circuits of both transistors during the interval each stores charge carriers, whereby the transistor conditioned to conduct more heavily conducts and the other is cut off.

2. In the circuit as set forth in claim 1, said transistors each including an input circuit and an output circuit, and further including means for normally maintaining said input and output circuits of said transistors at a reference potential.

References Cited in the file of this patent

UNITED STATES PATENTS

| | | |
|---|---|---|
| 2,211,750 | Humby et al. | Aug. 20, 1940 |
| 2,594,449 | Kircher | Apr. 29, 1952 |
| 2,644,892 | Gehman | July 7, 1953 |
| 2,682,638 | Enabnit | June 29, 1954 |
| 2,759,104 | Skellett | Aug. 14, 1956 |
| 2,778,978 | Drew | Jan. 22, 1957 |

FOREIGN PATENTS

| | | |
|---|---|---|
| 730,907 | Great Britain | June 1, 1955 |

OTHER REFERENCES

Trent: A Transistor Reversible Binary Counter, November 1952, Proceedings of the IRE, pages 1562–1572.

Transistors in Telemetry (Riddle), pages 178–180, Electronics, vol. 27, No. 1, January 1954.

"Directly Coupled Transistor Circuits," (Better, Bradly, Brown, and Rubinoff), pages 132–136, Electronics, June 1955.